United States Patent
Mikic

(10) Patent No.: US 10,190,326 B2
(45) Date of Patent: Jan. 29, 2019

(54) SCAFFOLD WITH SCAFFOLD HOLDER RECEPTABLE AND USE OF AN APERTURE IN A SCAFFOLD POLE

(71) Applicant: PERI GmbH, Weissenhorn (DE)

(72) Inventor: Erzad Mikic, Karlsruhe (DE)

(73) Assignee: PERI GMBH, Weissenhorn (DE)

( * ) Notice: Subject to any disclaimer, the term of this patent is extended or adjusted under 35 U.S.C. 154(b) by 0 days.

(21) Appl. No.: 15/822,191

(22) Filed: Nov. 26, 2017

(65) Prior Publication Data

US 2018/0073258 A1    Mar. 15, 2018

Related U.S. Application Data

(63) Continuation of application No. PCT/EP2016/057551, filed on Apr. 7, 2016.

(30) Foreign Application Priority Data

May 27, 2015    (DE) ........................ 10 2015 209 735

(51) Int. Cl.
| | |
|---|---|
| *E04G 1/14* | (2006.01) |
| *E04G 7/12* | (2006.01) |
| *E04G 1/38* | (2006.01) |
| *E04G 5/04* | (2006.01) |
| *E04G 5/06* | (2006.01) |
| *E04G 7/02* | (2006.01) |
| *E04G 7/22* | (2006.01) |
| *F16B 2/10* | (2006.01) |
| *F16B 7/04* | (2006.01) |

(52) U.S. Cl.
CPC ................ *E04G 7/12* (2013.01); *E04G 1/14* (2013.01); *E04G 1/38* (2013.01); *E04G 5/04* (2013.01);

(Continued)

(58) Field of Classification Search
CPC .... E04G 1/14; E04G 5/04; E04G 7/12; E04G 1/38

See application file for complete search history.

(56) References Cited

U.S. PATENT DOCUMENTS 2,435,461 A  *  2/1948  Parker ........................ E04G 1/12
                                                    248/243
2,593,122 A        4/1952  Droeger et al.
(Continued)

FOREIGN PATENT DOCUMENTS

AU                553886 A      7/1986
DE          32 18 046 A1     11/1983
(Continued)

OTHER PUBLICATIONS

PERI UP T70 Geruestsystem, Zulassung, 2006, Art.Nr. 791110, pp. 1, 22, 23, 25, 29. PERI GmbH, Weissenhorn, Germany.

*Primary Examiner* — Alvin C Chin-Shue
(74) *Attorney, Agent, or Firm* — Hackler Daghighian Martino & Novak

(57) ABSTRACT

A facade scaffold includes an inner pole, an outer pole and a scaffold cross-bar between the inner and outer poles. A hollow pole portion of the inner pole has a first receiving through-aperture for a coupling for the attachment of a scaffold holder. A maximum distance between the first receiving through-aperture and a top side of the scaffold cross-bar is no more than 300 mm. The first receiving through-aperture is arranged below the top side of the scaffold cross-bar, or is realized above the top side of the scaffold cross-bar as a first elongated hole. The longitudinal axis of the first elongated hole is aligned parallel to the pole longitudinal axis of the hollow pole portion. The invention simplifies and accelerates the operation of assembling a scaffold holder on a scaffold and for a two-pole scaffold holder allows a passage height under the scaffold holder to be increased.

8 Claims, 6 Drawing Sheets

(52) U.S. Cl.
CPC ............... *E04G 5/046* (2013.01); *E04G 5/06* (2013.01); *E04G 5/061* (2013.01); *E04G 5/062* (2013.01); *E04G 7/02* (2013.01); *E04G 7/22* (2013.01); *F16B 2/10* (2013.01); *F16B 7/0493* (2013.01)

(56) References Cited

U.S. PATENT DOCUMENTS

| | | | | | |
|---|---|---|---|---|---|
| 2,923,374 | A | * | 2/1960 | Harwell | E04G 1/14 182/132 |
| 2,929,602 | A | * | 3/1960 | Hyre | E04G 1/14 182/186.6 |
| 3,998,294 | A | * | 12/1976 | Moeller | E04G 5/04 182/229 |
| 4,430,019 | A | | 2/1984 | D'Alessio | |

FOREIGN PATENT DOCUMENTS

| | | |
|---|---|---|
| DE | 101 12 369 A1 | 9/2002 |
| DE | 101 12 372 A1 | 9/2002 |
| DE | 20 2006 015586 U1 | 2/2008 |
| GB | 1 599 842 A | 10/1981 |
| JP | S50907 Y1 | 1/1975 |
| JP | H03126958 U1 | 12/1991 |
| JP | 2006 219823 A | 8/2006 |
| WO | 2016188660 A1 | 12/2016 |

\* cited by examiner

SCAFFOLD WITH SCAFFOLD HOLDER RECEPTABLE AND USE OF AN APERTURE IN A SCAFFOLD POLE

CROSS-REFERENCE TO RELATED APPLICATIONS

This continuation application claims priority to PCT/EP2016/057551 filed on Apr. 7, 2016 which has published as WO 2016/188660 A1 and also the German application number 10 2015 209 735.8 filed on May 27, 2015, the entire contents of which are fully incorporated herein with these references.

FIELD OF THE INVENTION

The invention relates to a scaffold, in particular a facade scaffold, including an inner pole, an outer pole and a scaffold cross-bar between the inner pole and the outer pole.

BACKGROUND OF THE INVENTION

Scaffolds, on which or in the surrounding area of which there are people, have to be secured from falling and collapsing. Scaffolds which are erected on facades can be connected to the facade for securement against falling and collapsing. So-called scaffold holders are anchored on the facade and fastened on the scaffold for this purpose. Scaffold holders are conventionally arranged in a region below scaffold cross-bars which support a scaffold deck.

Fastening a substantially cylinder-tube-shaped scaffold holder on a cylinder-tube-shaped scaffold pole by means of a standard coupling is generally known. For this purpose, the standard coupling comprises two clip portions which are aligned at right angles to one another. The respective clip portions engage around the scaffold holder or the scaffold pole. A clamping screw, by means of which the respective clip portion can be clamped on the scaffold holder or on the scaffold pole, is arranged on each clip portion of the standard coupling.

A single scaffold holder can be connected to the scaffold with a single pole, i.e. only at one scaffold pole, namely an inner pole which is close to the facade. A single one-pole scaffold holder can only take loads in its direction of extension, in the majority of cases approximately at right angles to the facade and at right angles to a longitudinal direction of the scaffold.

In order to be able to take loads parallel to the facade as well, connecting one single scaffold holder to the scaffold with two poles is known, i.e. both with the inner pole and with an outer pole which is remote from the facade, in each case with a standard coupling. As an alternative to this, two scaffold holders can be arranged on the scaffold in the manner of a triangle tie, the two scaffold holders being aligned at an angle of approximately 90° with respect to one another and in each case of approximately 45° with respect to the facade. The two scaffold holders can be fastened for this purpose on the inner pole in each case with a standard coupling. As an alternative to this, a first scaffold holder can be fastened on the inner pole with a standard coupling and the second scaffold holder is fastened on the first scaffold holder with a further standard coupling.

A disadvantage of the aforementioned types of scaffold anchoring is first of all the considerable assembly expenditure which is generated, in particular, by the necessity for tightening two clamping screws per standard coupling. When manually tightening the clamping screws, there is also a risk of operating error in the sense of tightening the clamping screws too weakly or too strongly. In addition, in the case of two-pole scaffold holders, a passage height over a scaffold deck is severely limited by the scaffold holder running transversely through the scaffold as the scaffold holder has to be arranged at a spacing from a scaffold cross-bar, which is arranged above the scaffold holder, on account of the space required by the standard couplings.

The object underlying the invention is to simplify and to accelerate the operation for assembling a scaffold holder on a scaffold. In addition, in the case of a two-pole scaffold holder, the passage height under the scaffold holder is to be increased.

SUMMARY OF THE INVENTION

Said object is achieved by a scaffold with the features of the independent claim. The dependent claims provide preferred further developments.

Said object is achieved by a scaffold of the type designated in the introduction which is characterized in that in a hollow, in particular hollow-cylindrical, pole portion, the inner pole comprises a first receiving through-aperture for a coupling for the attachment of a scaffold holder, and that a maximum distance between the first receiving through-aperture and a top side of the scaffold cross-bar is no more than 300 mm, wherein the first receiving through-aperture is arranged below the top side of the scaffold cross-bar, or is realized above the top side of the scaffold cross-bar as a first elongated hole. It is understood that the hollow-cylindrical pole portion could be other shapes beyond cylindrical, such as rectangular, square, elliptical and various other shapes and the invention would work with these different shapes.

The first receiving through-aperture makes it possible to fasten the coupling on the inner pole in a simple manner. The coupling can preferably be hooked (latched) in the first receiving through-aperture for this purpose such that it engages behind a wall of the pole portion. The coupling is realized in a preferred manner as a half-coupling. An aperture, which breaks through a wall of a hollow scaffold pole, in particular of the inner pole, on one side such that a connection to an interior of the scaffold pole is opened up, is designated here as a receiving through-aperture. A first receiving through-aperture, which is arranged under the top side of the scaffold cross-bar, is preferably also realized as a first elongated hole, the longitudinal axis of the first elongated hole preferably being aligned parallel to the pole longitudinal axis of the hollow-cylindrical pole portion. The realization of the first receiving through-aperture as a first elongated hole can further facilitate the hooking-in of the coupling. At the same time, a defined alignment of the coupling can be automatically set up by the first elongated hole.

The time-consuming and error-prone process of tightening a clamping screw, as is used on a conventional standard coupling in order to fasten the standard coupling on the inner pole, is omitted as a result of the hooking-in of the coupling. Time can consequently be saved by a scaffold according to the invention when constructing the scaffold. The same also applies analogously to the disassembly where the releasing of the clamping screw is omitted. Instead of this, the coupling can be unhooked from the inner pole. A safety element, which prevents the coupling being unhooked unintentionally, is preferably arranged on the coupling and/or on the inner pole.

By the tightening and releasing of a clamping screw of a standard coupling for the fastening of the standard coupling on the inner pole being avoided according to the invention, the space required for handling the clamping screw, in particular by means of a screwdriver, is also omitted. It is consequently possible to arrange the coupling closer to a scaffold cross-bar and/or a scaffold deck on the inner pole. The maximum distance between the first receiving through-aperture and a top side of the scaffold cross-bar, in this case, is in a preferred manner no more than 200 mm, in a particularly preferred manner no more than 100 mm and quite particularly preferred no more than 60 mm. The maximum distance is measured parallel to the pole longitudinal axis. As the coupling can be fastened closer to the scaffold cross-bar, the flow of forces in the inner pole can also be improved. A bending load of the inner pole on account of forces introduced transversely to the inner pole by the scaffold holder can be reduced as a result of the distance between the scaffold holder and the scaffold cross-bar being reduced.

In the case of a constructed scaffold, the inner pole faces a facade; the outer pole, in the constructed state of the scaffold, turns away from the facade. When the scaffold includes single-part units with pole segments fastened non-releasably on both sides of the scaffold cross-bar, the inner pole preferably includes the shorter of the two pole segments insofar as the two pole segments are of different lengths.

The first receiving through-aperture is preferably arranged in such a manner on the inner pole that it breaks through the walls of the inner pole in a radial direction. In a preferred manner, the radial direction is aligned at least approximately orthogonally with respect to the scaffold cross-bar and consequently parallel to the facade. The first receiving through-aperture then points to an end face of the scaffold approximately in a longitudinal direction parallel to the facade. The load introduction from the scaffold holder via the coupling into the inner pole is effected substantially in a direction orthogonal to the radial direction of the first receiving through-aperture, in particular along a direction of extension of the scaffold holder.

The first receiving through-aperture is said to be arranged above the top side of the scaffold cross-bar when at least a part portion of the first receiving through-aperture is arranged above the top side of the scaffold cross-bar. Otherwise the first receiving through-aperture is said to be arranged below the top side of the scaffold cross-bar.

In the case of a preferred embodiment of the scaffold according to the invention, it is provided that opposite the first receiving through-aperture, a second receiving through-aperture in the pole portion of the inner pole is arranged below the top side of the scaffold cross-bar, or is realized above the top side of the scaffold cross-bar as a second elongated hole, wherein the longitudinal axis of the second elongated hole is preferably aligned parallel to the pole longitudinal axis of the hollow-cylindrical pole portion.

The flexibility when constructing the scaffold is increased as a result by the coupling being able to be arranged on both sides of the inner pole. Opposite preferably means at the same height along the pole longitudinal axis and diametrically with reference to the pole longitudinal axis. The second receiving through-aperture is preferably realized as the first receiving through-aperture, in particular in the same form and the same size. The first receiving through-aperture and the second receiving through-aperture are typically in alignment. It is then also possible to realize the inner pole in a mirror-symmetrical manner with respect to a plane containing the pole longitudinal axis such that when installing the inner pole, attention does not have to be paid to the alignment thereof with reference to said plane (if the inner pole is not connected non-releasably to the scaffold cross-bar).

Particularly preferred is an embodiment where it is provided that in a hollow-cylindrical pole portion the outer pole comprises a third receiving through-aperture for the coupling and that a maximum distance between the third receiving through-aperture and a top side of the scaffold cross-bar is preferably no more than 190 mm. In a preferred manner, the maximum distance between the third receiving through-aperture and a top side of the scaffold cross-bar is no more than 150 mm, in a particularly preferred manner no more than 100 mm and quite particularly preferred no more than 60 mm. The third receiving through-aperture is preferably realized as a third elongated hole, the longitudinal axis of the third elongated hole being aligned, in particular, parallel to the pole longitudinal axis of the hollow-cylindrical pole portion. The third receiving through-aperture is advantageously realized as the first receiving through-aperture, in particular in the same form and the same size. The third receiving through-aperture makes it possible to fasten a scaffold holder on the scaffold with two poles, i.e. on the inner pole and on the outer pole. Loads parallel to the facade can then also be absorbed and diverted into the facade by the two-pole scaffold holder.

A further development of said embodiment, where a fourth receiving through-aperture is arranged in the outer pole opposite the third receiving through-aperture, is advantageous. Flexibility when constructing the scaffold is increased as a result by the coupling being able to be arranged on both sides of the outer pole. The fourth receiving through-aperture is preferably realized as a fourth elongated hole, the longitudinal axis of the fourth elongated hole being aligned, in particular, parallel to the pole longitudinal axis of the hollow-cylindrical pole portion. The fourth receiving through-aperture is advantageously realized as the third receiving through-aperture, in particular in the same form and the same size. The third receiving through-aperture and the fourth receiving through-aperture are preferably in alignment. It is then also possible to realize the outer pole in a mirror-symmetrical manner with respect to a plane containing the pole longitudinal axis, such that when installing the outer pole, attention does not have to be paid to the alignment thereof with reference to said plane.

A scaffold where it is provided that a fifth receiving through-aperture is realized in the inner pole at a spacing from the first receiving through-aperture along the pole longitudinal axis is advantageous, as is a maximum distance between the fifth receiving through-aperture and the top side of the scaffold cross-bar being no more than 300 mm, in a preferred manner no more than 200 mm, in a particularly preferred manner no more than 100 mm and quite particularly preferred no more than 60 mm. The fifth receiving through-aperture is preferably realized as a fifth elongated hole, the longitudinal axis of the fifth elongated hole being aligned, in particular, parallel to the pole longitudinal axis of the hollow-cylindrical pole portion. The flexibility in the case of the arrangement of the scaffold holder on the scaffold can be further increased as a result. The first receiving through-aperture and the fifth receiving through-aperture can both be arranged above or both below the scaffold cross-bar; as an alternative to this, the first receiving through-aperture can be arranged below the scaffold cross-bar and the fifth receiving through-aperture can be arranged above the scaffold cross-bar or the first receiving through-aperture can be arranged above the scaffold cross-bar or the fifth receiving through-aperture can be arranged below the scaffold cross-bar. The fifth receiving through-aperture is advantageously realized as the first receiving through-aperture, in particular in the same form and the same size. The longitudinal axes of a first elongated hole and of the fifth elongated hole preferably coincide.

It is provided in an advantageous manner that a sixth receiving through-aperture is realized in the pole portion of the inner pole opposite the fifth receiving through-aperture. The sixth receiving through-aperture is preferably realized as a sixth elongated hole, the longitudinal axis of the sixth elongated hole being aligned, in particular, parallel to the pole longitudinal axis of the hollow-cylindrical pole portion. The flexibility when constructing the scaffold can be increased as a result by the coupling being able to be arranged on both sides of the outer pole. The sixth receiving through-aperture is advantageously realized as the fifth receiving through-aperture, in particular in the same form and the same size. The fifth receiving through-aperture and the sixth receiving through-aperture are preferably in alignment. It is then also possible to realize the inner pole in a mirror-symmetrical manner with respect to a plane containing the pole longitudinal axis, such that when installing the inner pole, attention does not have to be paid to the alignment thereof with reference to said plane.

Consequently, above and/or below the top side of the scaffold cross-bar in each case up to two (pairs of oppositely situated) receiving through-apertures, which are spaced apart from one another, can be realized on the inner pole. In particular, in this case, it is also possible for a receiving through-aperture to be arranged between the top edge and a bottom edge of the scaffold cross-bar. As an alternative to this, a receiving through-aperture can be arranged at the height of the top edge or of the bottom edge of the scaffold cross-bar.

A preferred embodiment is characterized in that the scaffold includes a coupling for the attachment of a scaffold holder and a fixing element for fastening the coupling on the pole portion, wherein the fixing element is held captively on the coupling. As a result, the handling of the coupling can be further facilitated and the assembly thereof on the inner pole and/or outer pole can be further accelerated.

Particularly preferred is a further development where it is provided that in its first position the fixing element is insertable into the first receiving through-aperture, and that in its second position the fixing element engages behind a wall of the pole portion on two oppositely situated sides of the first receiving through-aperture. The assembly and disassembly of the coupling can be facilitated considerably as a result. For assembly, the fixing element can be moved into its first position and inserted into the first receiving through-aperture. The fixing element can then be moved into its second position so that it engages behind the wall of the pole portion on two sides and consequently fixes the coupling on the pole portion. The fixing element is able to be moved in a preferred manner merely by hand, i.e. without using a tool, from its first position into its second position and back into its first position. The fixing element can be moved into its first position in order to disassemble the coupling from the inner pole so that the fixing element is able to be removed from the receiving through-aperture.

In the case of an advantageous further development, it is provided that the coupling includes a basic body, and that the fixing element is arranged non-rotatably on the basic body. The handling of the fixing element, in particular the moving of the fixing element into its first or second position, is possible in a particularly simple manner by means of the basic body. The basic body can also serve at the same time for supporting the coupling on the outside of the pole portion. The basic body can be integrated into a clip portion for receiving the scaffold holder or can be realized as a separate component of the coupling. Non-rotatable means that it is not possible to rotate the fixing element about at least one axis in relation to the basic body; the fixing element is preferably prevented from rotating about all the axes in relation to the basic body.

Particularly preferred is a further development where the fixing element is realized as a projection with a neck and two holding portions which are located opposite one another with reference to the neck and project laterally beyond the neck. The fixing element is consequently preferably realized in a substantially T-shaped manner. A fixing element realized in this manner can be inserted into an elongated hole when the projections are aligned in the direction of the longitudinal axis of the elongated hole. As a result of simply rotating the fixing element, preferably as a result of rotating it by approximately 90°, for instance by between 80° and 100°, the projections can be moved to engage behind the wall of the pole portion such that the coupling is held on the pole portion. The neck of the fixing element preferably comprises a round cross section in order to facilitate the rotating of the fixing element during assembly; as an alternative to this, a cross section of the neck can be realized in a rectangular manner. In the case of a further development which is alternative to this, the fixing element can be realized with an expanding mechanism, at least two holding portions of the fixing element being movable by the expanding mechanism so as to engage behind the wall of the pole portion.

In the case of an advantageous further development, it is provided that a blocking element is arranged on the pole portion, and that the fixing element is held in the second position above the basic body by the blocking element. Unintentional transfer of the fixing element from the second into the first position can be avoided as a result. This increases the operational safety of the scaffold according to the invention as the coupling is fixed securely on the pole portion. The blocking element is preferably arranged at a spacing from the respective receiving through-aperture in the direction of the pole longitudinal axis.

Preferred is a development where the blocking element is realized as the scaffold cross-bar or as a scaffold cross-bar receptacle arranged on the pole portion, in particular in the form of a rosette or a rosette part. As a result, elements that are already present on the pole portion anyway can be utilized as the blocking element. As a result, the blocking element can be realized on the pole portion without additional expenditure, in particular with regard to costs for production and material.

In the case of a particularly advantageous development, it is provided that the basic body and the blocking element are realized in such a manner that to transfer the fixing element from the second position into the first position, an elastic resistance between the blocking element and the basic body has to be overcome. In this way it can be ensured that the fixing element does not pass unintentionally from the second into the first position. The strength of the elastic resistance is advantageously realized such that it is able to be overcome using manual force. The disassembly of the coupling from the pole portion can then be effected without a tool. An elastic resistance also has to be overcome for transferring the blocking element from the first position into the second position. As a result, when assembling the coupling on the pole portion, a palpable signal which confirms the regular transferring of the fixing element into the second position, can be generated.

In the case of a particularly advantageous development, it is provided that the basic body comprises a longitudinal side and a transverse side, that a first distance between the transverse side and the neck of the fixing element is greater than a second distance between the longitudinal side and the neck of the fixing element, that a rounded transition is realized between the longitudinal side and the transverse side, that in the first position, the longitudinal side faces the fixing element, that in the second position, the transverse side faces the fixing element, and that in the second position a space between the transverse side and the fixing element is no more than half as large as a length of the first receiving through-aperture, which is realized as a first elongated hole, minus a diameter of the neck of the fixing element. As a result, the blocking action of the blocking element can be supported in a particularly simple manner by it not being possible to displace the fixing element in the second position along the longitudinal axis of the first elongated hole until the neck axis of the neck of the fixing element reaches the middle of the first elongated hole. The first distance and the second distance are measured orthogonally to the neck axis.

Particularly preferred is a further development where in the second position the fixing element engages behind the wall of the pole portion at two oppositely located sides of the first receiving through-aperture transversely to the longitudinal axis of the first receiving through-aperture, wherein the first receiving through-aperture is realized as a first elongated hole. Transferring the fixing element from the first position into the second position and back is effected in a particularly simple manner in this way as a result of rotating the fixing element. The fixing element can then be realized in a particularly compact manner.

Also advantageous is a further development, which is alternative to this, where in the second position the fixing element engages behind the wall of the pole portion on two oppositely situated sides of the first receiving through-aperture along the longitudinal axis of the first receiving through-aperture, wherein the first receiving through-aperture is realized as a first elongated hole. The fixing element, in particular a cross section of a neck of the fixing element, can be realized in an elongated manner for this purpose such that an alignment of the coupling relative to the pole portion can be predefined by the fixing element.

A particularly advantageous further development provides that the coupling is fastened on the inner pole by the fixing element engaging in the first receiving through-aperture, that the scaffold additionally includes a scaffold holder, and that the scaffold holder is fastened on the inner pole by means of the coupling. The scaffold holder can be fastened rapidly (with a few, simple hand moves) on the scaffold by way of the coupling. Such a scaffold can be secured against collapsing by the scaffold holder being fastened additionally on a facade of a building or the like. The scaffold holder is typically realized in a substantially cylinder-tube-shaped manner and is gripped and clamped and held by the coupling.

In the case of a particularly preferred further development, it is provided that the scaffold includes a further coupling for a scaffold holder. Two scaffold holders can then be fastened on both sides of the inner pole or the outer pole. In particular, the two scaffold holders can support the scaffold on the facade in the manner of a triangle tie attachment. The couplings can be realized for this purpose in such a manner that it is possible to bend the scaffold holder in relation to a transverse direction of the scaffold which is orthogonal to the facade. As an alternative to this, the further coupling can be used to fasten a scaffold holder both on the inner pole and on the outer pole.

The use of a first receiving through-aperture in a scaffold pole of a scaffold for the attachment of a scaffold holder to a scaffold pole also falls within the framework of the present invention. The attachment of the scaffold holder on the scaffold is facilitated by the use according to the invention. The scaffold pole can be an outer pole which is remote from the facade or—in a preferred manner—an inner pole which is close to the facade. The first receiving through-aperture or the scaffold can be further developed in an advantageous manner as described above. A coupling and a fixing element, which are realized as described above, are preferably used for the attachment of the scaffold holder.

Further advantages of the invention are produced from the following description and the drawing. The features named previously and the features expanded further can also be used in each case according to the invention individually per se or in multiples in arbitrary combinations. The embodiments shown and described are not to be understood as a definitive list, but rather have an exemplary character for the depiction of the invention.

BRIEF DESCRIPTION OF THE DRAWINGS

The invention is shown in the drawing and is explained in more detail by way of exemplary embodiments, in which.

DETAILED DESCRIPTION OF THE
PREFERRED EMBODIMENTS

Figure 1:
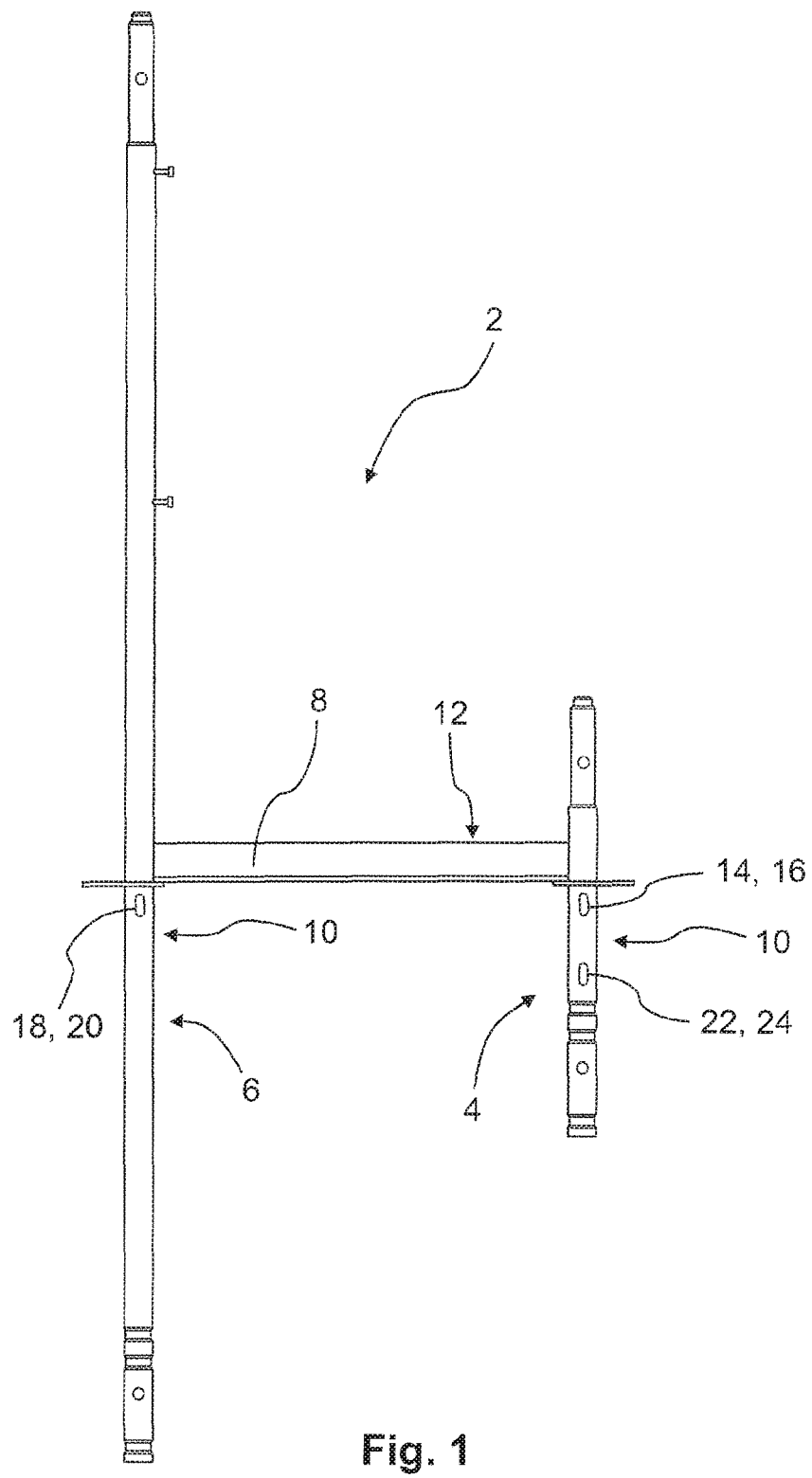
FIG. 1 shows a schematic view of a first embodiment of a scaffold according to the invention.

FIG. 1 shows a schematic representation of a first embodiment of a scaffold 2 which is realized here as a facade scaffold, having an inner pole 4, an outer pole 6 and a scaffold cross-bar 8 between the inner pole 4 and the outer pole 6. The inner pole 4 and the outer pole 6 are realized here as pole segments which are connected non-releasably to the scaffold cross-bar 8 to form a unit. A scaffold deck (not shown) can be fastened to the scaffold cross-bar 8.

The inner pole 6 comprises a first receiving through-aperture 14, which is realized here as a first elongated hole 16, in a hollow-cylindrical pole portion 10 below the top side 12 of the scaffold cross-bar 8. The first receiving through-aperture 14 serves for fastening a coupling (not shown) for a scaffold holder (not shown) on the inner pole 4. The top side 12 of the scaffold cross-bar 8 relates in this case to the assembled (erected) state of the scaffold 2.

A third receiving through-aperture 18 is realized in the outer pole 6 in a hollow-cylindrical portion 10. The third receiving through-aperture 18 is realized here as a third elongated hole 20 and is realized at the same height (at the same distance away from the top side 12 of the scaffold cross-bar 8) as the first receiving through-aperture 14. This makes it possible to fasten a scaffold holder (not shown) both on the inner pole 4 and the outer pole 6 by means of in each case a coupling (not shown).

A fifth receiving through-aperture 22, which is realized as a fifth elongated hole 24, is arranged here in the hollow-cylindrical pole portion 10 of the inner pole 4 at a spacing from the first receiving through-aperture 14. The fifth receiving through-aperture 22 provides a further fastening option for a scaffold holder (not shown).

Figure 2:
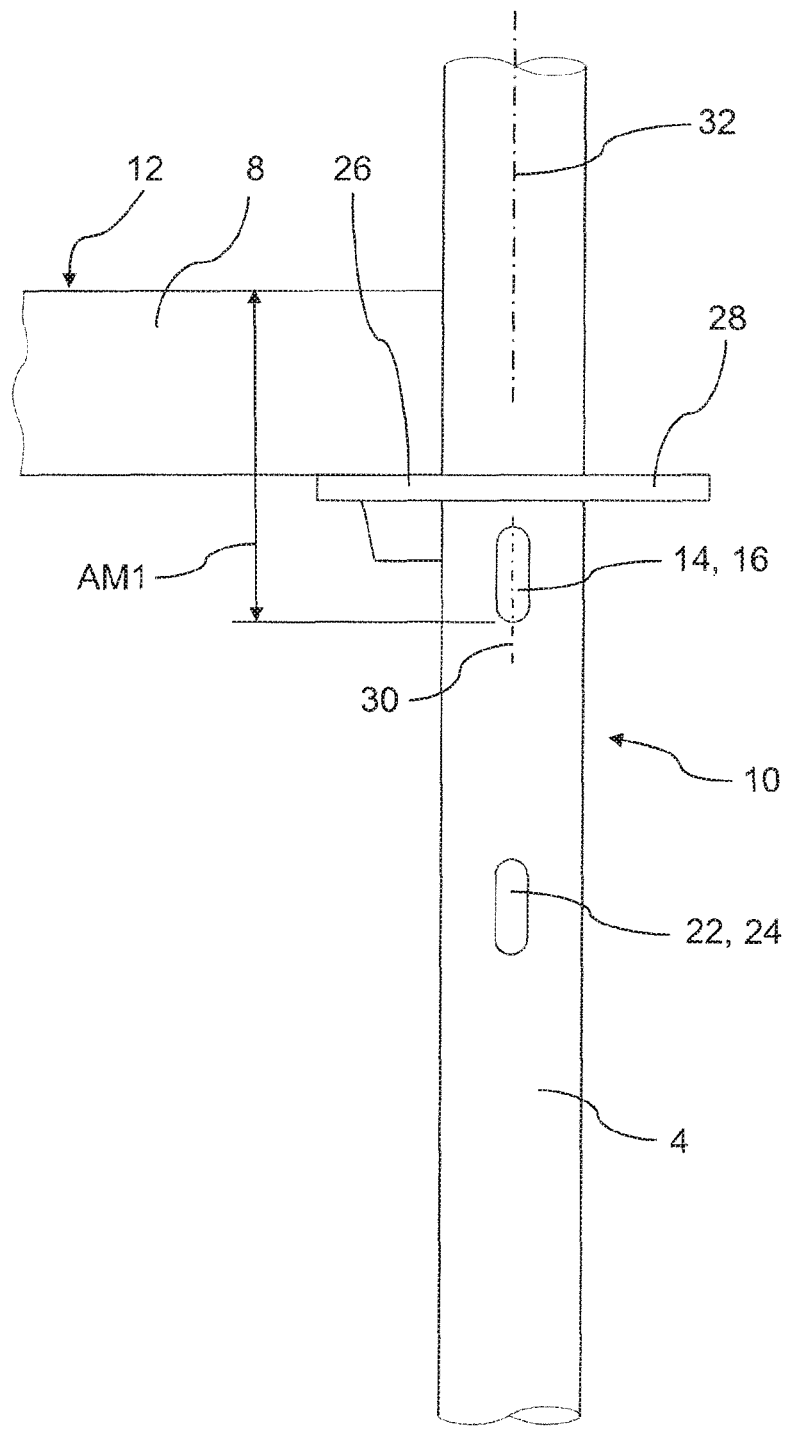
FIG. 2 shows a schematic view of an inner pole of a second embodiment of a scaffold according to the invention with a first receiving through-aperture and a fifth receiving through-aperture.

FIG. 2 shows a schematic view of an inner pole 4 of a second embodiment of a scaffold according to the invention with a first receiving through-aperture 14 and a fifth receiving through-aperture 22. A scaffold cross-bar 8 is fastened here on the inner pole 4 by means of a scaffold cross-bar receptacle 26 in the form of an annularly circumferential rosette 28.

The first receiving through-aperture 14 is arranged here directly below the rosette 28 and is realized as a first elongated hole 16. A maximum distance AM1 between the first receiving through-aperture 14 and a top side 12 of the scaffold cross-bar 8 is less here than 110 mm. The longitudinal axis 30 of the first elongated hole 16, in this case, is aligned parallel to the pole longitudinal axis 32 of the hollow-cylindrical pole portion 10.

Figure 3:
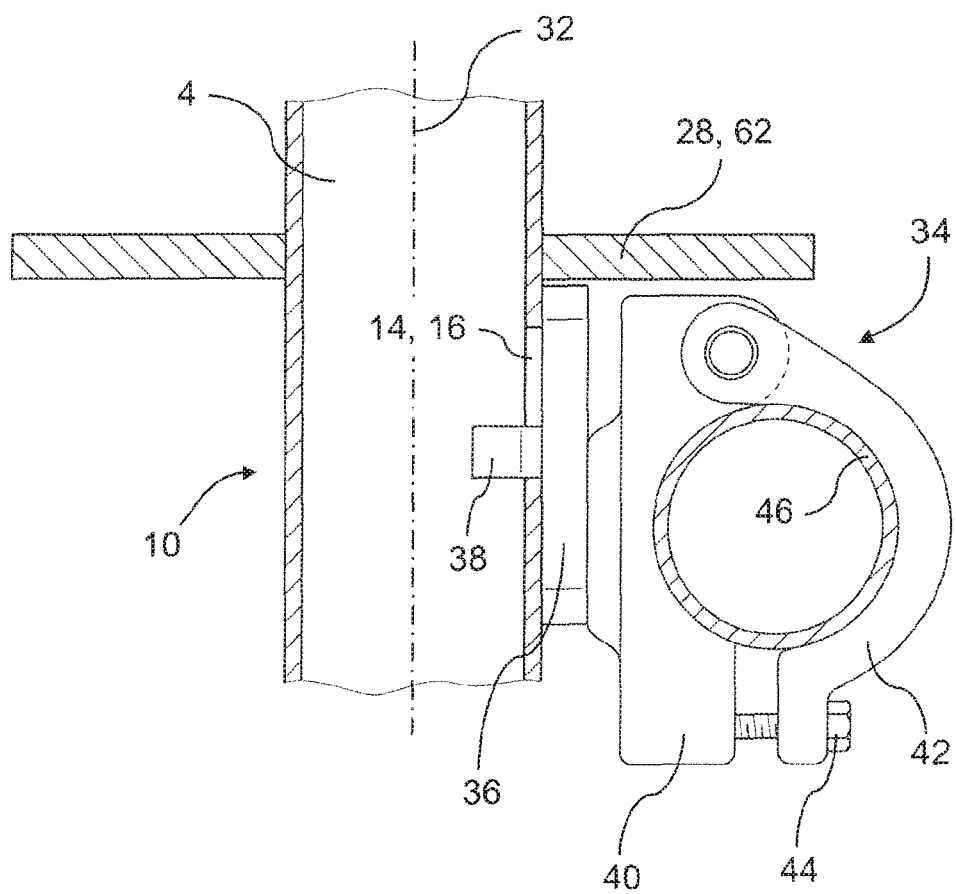
FIG. 3 shows a schematic longitudinal section through the inner pole of a third embodiment of a scaffold according to the invention with a coupling held in the first receiving through-aperture for a scaffold holder.
Figure 4:
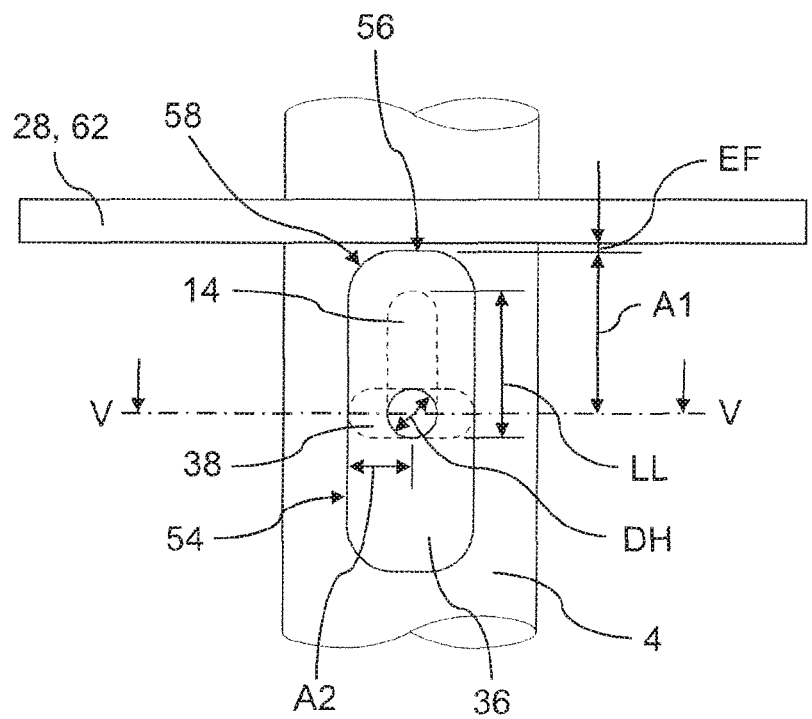
FIG. 4 shows a schematic side view of the inner pole of FIG. 3 looking at the basic body of the coupling.
Figure 5:
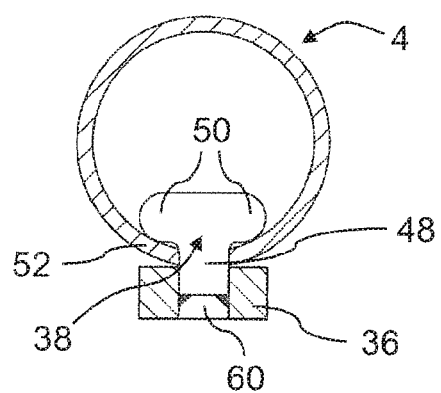
FIG. 5 shows a schematic cross section through the inner pole of FIG. 3 with the hooked-in fixing element and the basic body of the coupling.

FIGS. 3, 4 and 5 show schematic representations of a detail of a third embodiment of a scaffold according to the invention. FIG. 3 shows a schematic longitudinal section through an inner pole 4 of the scaffold and a coupling 34 fastened on the inner pole 4. FIG. 4 shows a schematic side view of the inner pole 4 looking at a basic body 36 of the coupling 34 (see FIG. 3). FIG. 5 shows a schematic cross section through the inner pole 4 and the basic body 36 of the coupling 34 (see FIG. 3) along the plane V-V from FIG. 4. The third embodiment of the scaffold according to the invention is subsequently explained in a synopsis of FIGS. 3, 4 and 5.

The coupling 34 includes the basic body 36 with a fixing element 38, a clip portion 40, a clamping bracket 42 and a clamping screw 44. For the sake of clarity, FIGS. 4 and 5 each simply show the basic body 36 with the fixing element 38. A scaffold holder 46 is engaged around by the clip portion 40 and the clamping bracket 42. The scaffold holder 46 is fixed on the coupling 34 as a result of tightening the clamping screw 44.

The coupling 34 is held in the first receiving through-aperture 14. The fixing element 38 is realized here as a T-shaped projection with a neck 48 and two holding portions 50 which are located opposite one another with reference to the neck 48 and project beyond the neck 48. The two holding portions 50 engage behind a wall 52 of a hollow-cylindrical pole portion 10 on two oppositely situated sides of the first receiving through-aperture 14 transversely with respect to the pole longitudinal axis 32.

The fastening and releasing of the coupling 34 is effected here in the manner of a bayonet closure as a result of rotating the coupling 34, here as a result of rotating it by 90°. The first receiving through-aperture 14 is realized as a first elongated hole 16 for this purpose. A length LL of the first elongated hole 16 is chosen to be of such a length, in this connection, that the fixing element 38 can be inserted into the first receiving through-aperture 14 or can be removed from the first receiving through-aperture 14 in a first position which is rotated by 90° in relation to the second position shown.

The basic body 36 of the coupling 34 is realized here as a plate with a longitudinal side 54, a transverse side 56 and a rounded transition 58 between the longitudinal side 54 and the transverse side 56. In this case, a first distance A1 between the transverse side 56 and the neck 48 is greater than a second distance A2 between the longitudinal side 54 and the neck 48. The fixing element 38 is fastened non-rotatably on the basic body 36; here, the neck 48 of the fixing element 38 is welded in a central bore 60 of the basic body 36.

The first receiving through-aperture 14 is arranged here directly below a rosette 28 on the inner pole 4 of the scaffold. The rosette 28 can serve for fastening a scaffold cross-bar (not shown) or other components of the scaffold on the inner pole 4. The rosette 28 acts here additionally as a blocking element 62. A space EF between the blocking element 62 and the transverse side 56, which faces the blocking element 62 in the second position of the fixing element 38, is chosen here in such a way that when the coupling 34 is rotated from the second position into the first position and vice versa, the rounded transition 58 has to be run past the blocking element 62 overcoming an elastic resistance. In particular, the space EF here is less than half the size of the length LL of the first elongated hole 16 minus a diameter DH of the neck 48 of the fixing element 38.

In the first position of the coupling 34 and of the fixing element 38, which is rotated by 90° in relation to the second position shown, the coupling 34 is able to be displaced upward until the fixing element 38 can be removed out of the inner pole 4. To this end, the second distance A2 between the longitudinal side 54 of the basic body 36 and the neck 48 of the fixing element is chosen correspondingly smaller than the first spacing A1 between the transverse side 56 and the neck 48.

Figure 6:
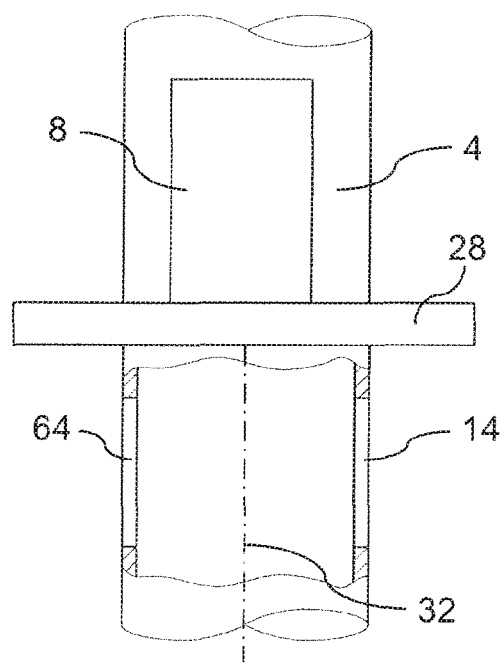
FIG. 6 shows a schematic, part-broken rear view of an inner pole of a fourth embodiment of a scaffold according to the invention with a first receiving through-aperture and a second receiving through-aperture.

FIG. 6 shows a schematic, part-broken rear view of an inner pole 4 of a fourth embodiment of a scaffold according to the invention. A first receiving through-aperture 14 and a second receiving through-aperture 64 are realized in the inner pole 4. The second receiving through-aperture 64 is arranged diametrically opposite the first receiving through-aperture 14 at the same height along the pole longitudinal axis 32. In addition, the second receiving through-aperture 64 is realized in the same form and size as the first receiving through-aperture 14 such that the same coupling (not shown) can be fastened selectively on the first receiving through-aperture 14 or the second receiving through-aperture 64. A rosette 28 is arranged on the inner pole 4 above the first receiving through-aperture 14 and the second receiving through-aperture 64, a scaffold cross-bar 8 being fastenable on the rosette 28.

Figure 7:
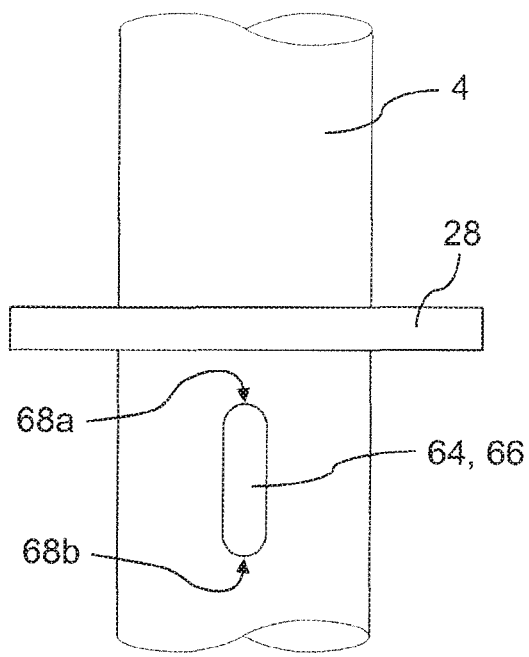
FIG. 7 shows a schematic side view of the inner pole of FIG. 6.

FIG. 7 shows a schematic side view of the inner pole 4 of FIG. 6. The second receiving through-aperture 64 is realized here as a second elongated hole 66 with rounded narrow sides 68a, 68b. A first narrow side 68a, in this case, points directly toward the rosette 28, a second narrow side 68b points directly away from the rosette 28.

Figure 8:
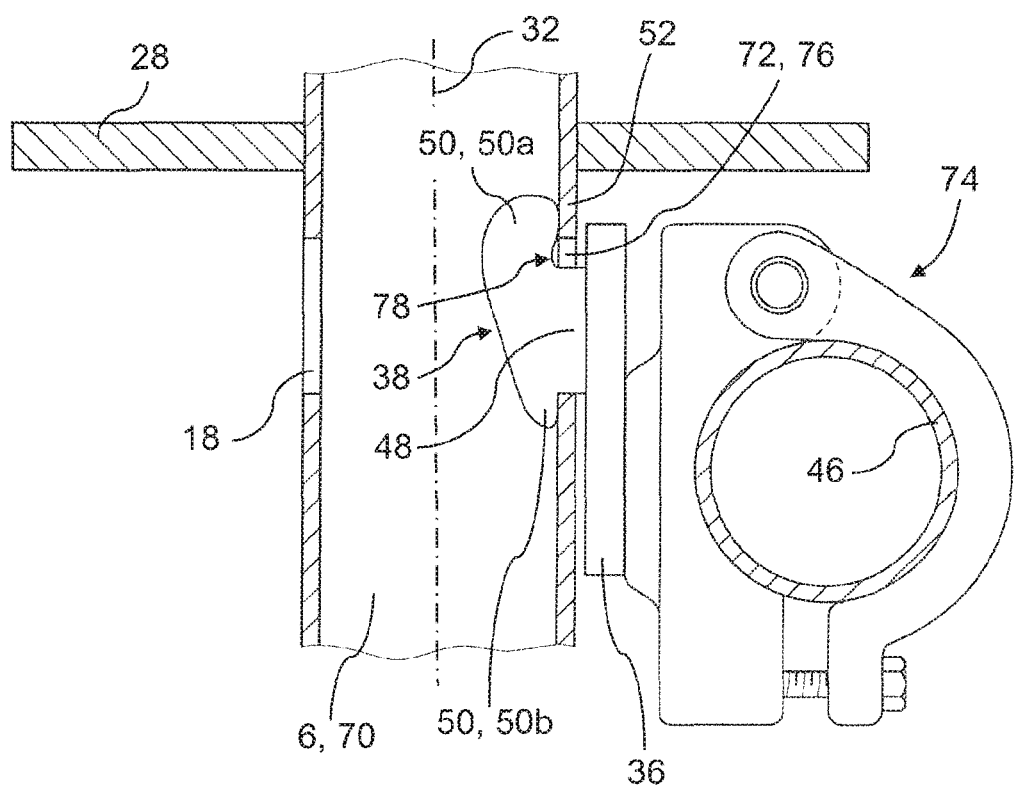
FIG. 8 shows a schematic longitudinal section through an outer pole of a fifth embodiment of a scaffold according to the invention with a third receiving through-aperture and a fourth receiving through-aperture as well as a further coupling.

FIG. 8 shows a schematic longitudinal section through a scaffold pole 70 of a fifth embodiment of a scaffold according to the invention. The scaffold pole 70 is realized here as an outer pole 6. A third receiving through-aperture 18 and a fourth receiving through-aperture 72 are realized in the outer pole 6. A scaffold holder 46 is engaged around and held in a clamped manner both on the inner pole (not shown) by a coupling (not shown) and on the outer pole 6 by a further coupling 74. The further coupling 74 is fastened in the fourth receiving through-aperture 72. The fourth receiving through-aperture 72 is realized here as a fourth elongated hole 76.

A fixing element 38 of the further coupling 74 is realized as an ear-shaped projection beyond a basic body 36 of the further coupling 74. Two holding portions 50, namely an upper holding portion 50a and a lower holding portion 50b, which project beyond a neck 48 of the fixing element 38, engage behind a wall 52 of the outer pole 6 at two oppositely situated sides along the pole longitudinal axis 32 in the second position shown.

In the first position for assembly or disassembly of the further coupling 74 on or from the outer pole 6, the further coupling 74 is slid upward in the fourth receiving through-aperture 72 such that the neck 48 abuts against the top side of the fourth elongated hole 76, and at the bottom side pivots radially away from the outer pole 6. An indentation 78 is realized on the upper holding portion 50a in order to make the pivoting possible. No rotating takes place therefore as in the case of the coupling 34 shown in FIG. 3.

The lower holding portion 50b here projects so far beyond the neck 48 that to hook the fixing element 36 into the outer pole 6 or to unhook the fixing element 36 from the outer pole 6, the lower holding portion 50b has to overcome an elastic resistance between the lower holding portion 50b and a bottom narrow side of the fourth elongated hole 76. In addition, a blocking element (not shown) can be arranged between a rosette 28, which is arranged above the fourth receiving through-aperture 72, and the basic body 36 such that the fixing element 38 is held in the second position. The blocking element can, for example, engage around the scaffold pole 70 below the rosette 28 or can be fastened on the rosette 28.

By carrying out a synopsis of all the figures of the drawing, the invention relates in summary to a scaffold 2 with an inner pole 4 and an outer pole 6. At least the inner pole 4 comprises a first receiving through-aperture 14. The first receiving through-aperture 14 serves for connecting the scaffold 2 to a coupling 34 or anchoring the scaffold 2 on a facade. The inner pole 4 and the outer pole 6 are connected by means of a scaffold cross-bar 8 of the scaffold 2. The first receiving through-aperture 14 can be realized above or below the top side 12 of the scaffold cross-bar 8 on the inner pole 4. The terms "below" and "above" refer, in this case, within the framework of the present invention, to the scaffold 2 in the erected state. When the first receiving through-aperture 14 is realized above the top side 12 of the scaffold cross-bar 8, it is realized in the form of a non-circular receiving through-aperture, in particular in the form of a first elongated hole 16. The first receiving through-aperture 14 is at a spacing from the top side 12 of the scaffold cross-bar 8 of less than 300 mm, in particular less than 250 mm and in a particularly preferred manner less than 200 mm. In a further preferred manner, the first receiving through-aperture 14 completely penetrates the inner pole 4 such that the inner pole 4 comprises a second receiving through-aperture 64 which is situated opposite the first receiving through-aperture 14. In a particularly preferred configuration of the invention, the outer pole 6 comprises a third receiving through-aperture 18 at the same vertical height as the first receiving through-aperture 14 in order to anchor the scaffold 2 on the facade with a two-pole scaffold holder, which is connectable both to the first receiving through-aperture 14 and to the third receiving through-aperture 18. The third receiving through-aperture 18 can penetrate the outer pole 6 completely such that the outer pole 6 comprises a fourth receiving through-aperture 72 which is situated opposite the third receiving through-aperture 18.

What is claimed is:

1. A scaffold in the form of a facade scaffold, the scaffold comprising:
    an inner pole;
    an outer pole; and
    a transom between the inner pole and the outer pole;
    wherein in a hollow pole portion the inner pole comprises a first receiving through-aperture configured for a coupling for the attachment of a scaffold holder;
    wherein a maximum distance between the first receiving through-aperture and a top side of the transom is no more than 300 mm;
    wherein the first receiving through-aperture either:
        a) is arranged below the top side of the transom, or
        b) is above the top side of the transom as a first elongated hole; and
    wherein the scaffold includes the scaffold holder;
    wherein the scaffold includes the coupling for the attachment of the scaffold holder and a fixing element for fastening the coupling on the pole portion;
    wherein the fixing element is held captively on the coupling;
    wherein the coupling is fastened on the inner pole by the fixing element engaging in the first receiving through-aperture; and
    wherein the scaffold holder is fastened on the inner pole by means of the coupling, wherein the scaffold holder is engaged around and held in a clamped manner by the coupling, wherein in a first position the fixing element is insertable into the first receiving through-aperture, and in a second position the fixing element engages behind a wall of the hollow pole portion on two oppositely situated sides of the first receiving through-aperture, wherein the coupling includes a basic body, and wherein the fixing element is arranged non-rotatably on the basic body, wherein the fixing element is a projection with a neck and two holding portions which are located opposite one another with reference to the neck and project laterally beyond the neck, wherein a blocking element is arranged on the hollow pole portion of the inner pole, and wherein the blocking element and the basic body holds the fixing element in the second position, wherein the blocking element is the transom or a transom receptacle which is arranged on the hollow pole portion of the inner pole, or in the form of a rosette or a rosette part, wherein the basic body and the blocking element are positioned in a manner on the hollow pole portion of the inner pole that in transferring the fixing element from the second position into the first position, an elastic resistance between the blocking element and the basic body has to be overcome.

2. The scaffold as claimed in claim 1, wherein a second receiving through-aperture is arranged opposite the first receiving through-aperture in the hollow pole portion of the inner pole, wherein the second receiving through-aperture is either:
    a) below the top side of the transom; or
    b) is above the top side of the transom as a second elongated hole;

wherein a longitudinal axis of the second elongated hole is aligned parallel to a pole longitudinal axis of the hollow pole portion.

3. The scaffold as claimed in claim 2, wherein the outer pole comprises a third receiving through-aperture for the coupling in a hollow pole portion, and wherein a maximum distance between the third receiving through-aperture and the top side of the transom is no more than 190 mm.

4. The scaffold as claimed in claim 3, wherein a fourth receiving through-aperture is opposite the third receiving through-aperture in the hollow pole portion of the outer pole.

5. The scaffold as claimed in claim 1, wherein the basic body comprises a longitudinal side and a transverse side, wherein a first distance between the transverse side and the neck of the fixing element is greater than a second distance between the longitudinal side and the neck of the fixing element, wherein a rounded transition is realized between the longitudinal side and the transverse side, wherein the first position the longitudinal side faces the blocking element; wherein the second position the transverse side faces the blocking element, and wherein the second position a space between the transverse side and the blocking element is no more than half the size of a length of the first receiving through-aperture which is realized as the first elongated hole minus a diameter of the neck of the fixing element.

6. The scaffold as claimed in claim 5, wherein in the second position the fixing element engages behind the wall of the hollow pole portion of the inner pole at two oppositely situated sides of the first receiving through-aperture transversely to the longitudinal axis of the first receiving through-aperture which is realized as the first elongated hole.

7. The scaffold as claimed in claim 5, wherein in the second position the fixing element engages behind the wall of the hollow pole portion of the inner pole at two oppositely situated sides of the first receiving through-aperture along the longitudinal axis of the first receiving through-aperture which is as the first elongated hole.

8. The scaffold as claimed in claim 1, wherein the scaffold includes a second coupling for a second scaffold holder.

* * * * *

UNITED STATES PATENT AND TRADEMARK OFFICE
CERTIFICATE OF CORRECTION

PATENT NO. : 10,190,326 B2
APPLICATION NO. : 15/822191
DATED : January 29, 2019
INVENTOR(S) : Mikic Page 1 of 1

It is certified that error appears in the above-identified patent and that said Letters Patent is hereby corrected as shown below:

Column 14, Line 17, "as" should be deleted

Signed and Sealed this
Twenty-second Day of October, 2019

Andrei Iancu
*Director of the United States Patent and Trademark Office*